Jan. 20, 1959 W. G. MILLER ET AL 2,869,660
AUTOMATIC COUPLING FOR POWER SHAFTS ON COUPLED VEHICLES
Filed Nov. 30, 1956 3 Sheets-Sheet 1

INVENTORS.
WILLIAM G. MILLER &
LEONARD M. KRAUSE
BY
James E. Nilles
ATTORNEY.

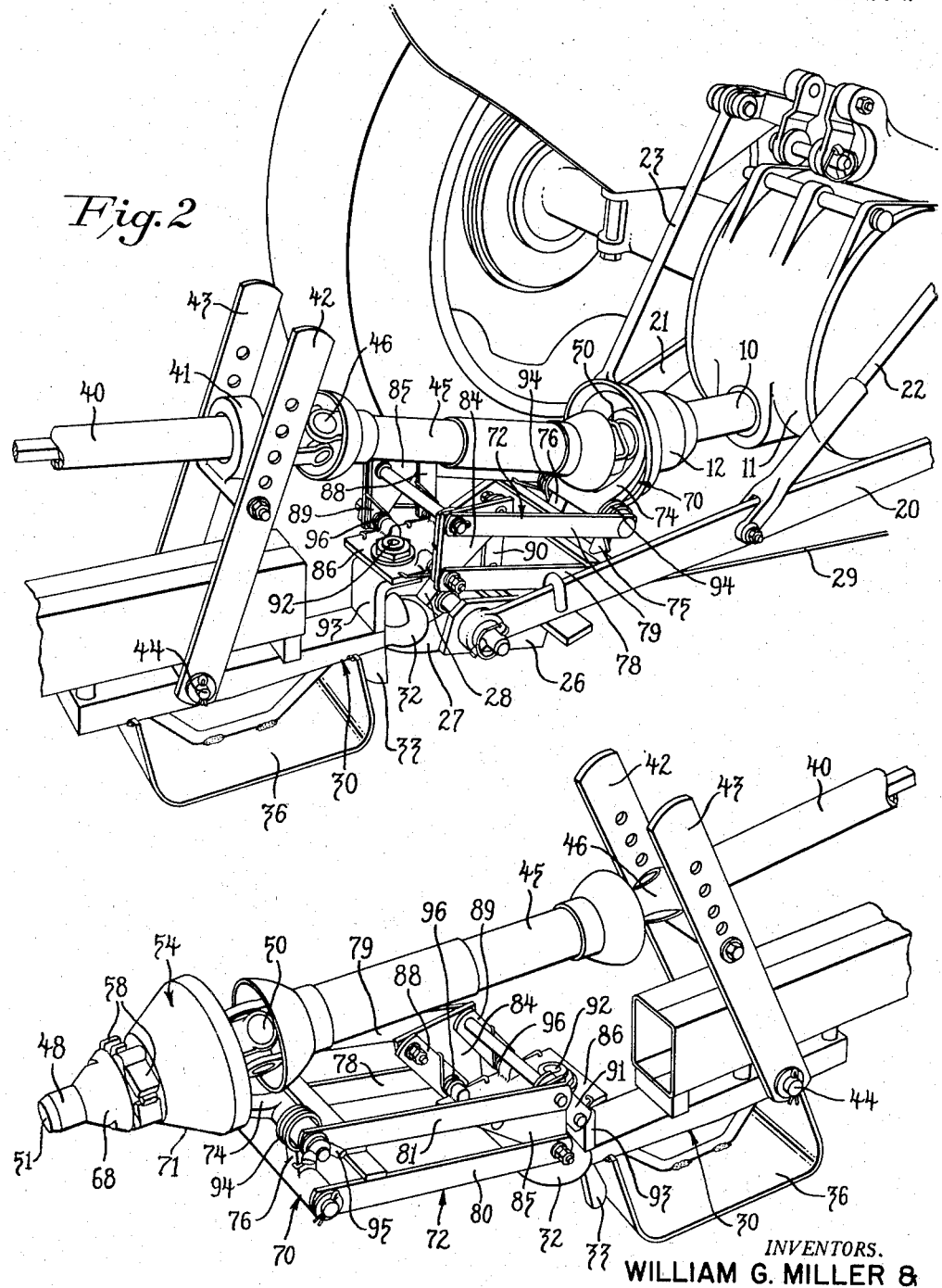

Jan. 20, 1959  W. G. MILLER ET AL  2,869,660
AUTOMATIC COUPLING FOR POWER SHAFTS ON COUPLED VEHICLES
Filed Nov. 30, 1956  3 Sheets-Sheet 3

INVENTORS.
WILLIAM G. MILLER &
LEONARD M. KRAUSE
BY James E. Nilles
ATTORNEY.

United States Patent Office 2,869,660
Patented Jan. 20, 1959

2,869,660

AUTOMATIC COUPLING FOR POWER SHAFTS ON COUPLED VEHICLES

William G. Miller and Leonard M. Krause, Toronto, Ontario, Canada, assignors to Massey-Ferguson Inc., a corporation of Maryland Application November 30, 1956, Serial No. 625,336

15 Claims. (Cl. 180—14)

This invention relates to agricultural implements of the type which receive power for operating their various component parts from a propelling vehicle. More specifically the invention relates to means for automatically coupling a power transmitting shaft between the tractive vehicle and the implement. The invention finds particular utility when used with tractors having a vertically positionable draw bar.

It is an object of the present invention to provide a coupling for a power shaft of a tractor and trailed implement unit which can be quickly and easily connected or disconnected and the implement moved to a parking or transport position without the necessity of the tractor operator leaving the tractor seat.

It is another object of the invention to provide a holding device for an implement power shaft which holds the latter at a predetermined height for ready connection to a tractor power shaft.

Another object of the invention is to provide a quick connection joint for a power take-off shaft of a tractor, including an over-running clutch which not only permits the implement to over-run but also provides easy alignment and a positive driving connection between the implement and tractor power shafts.

Other objects and advantages will become more apparent from the following detailed description, taken in conjunction with the attached sheet of drawings in which, by way of preferred example only, is illustrated the invention.

In the drawings:

Figure 2 is a view similar to Figure 1 but with the implement connected to the tractor and the implement in the raised, working position.

Figure 3 is a perspective view of the implement and its power shaft as shown in Figure 1 but taken generally from the front-left side thereof.

Figure 1:
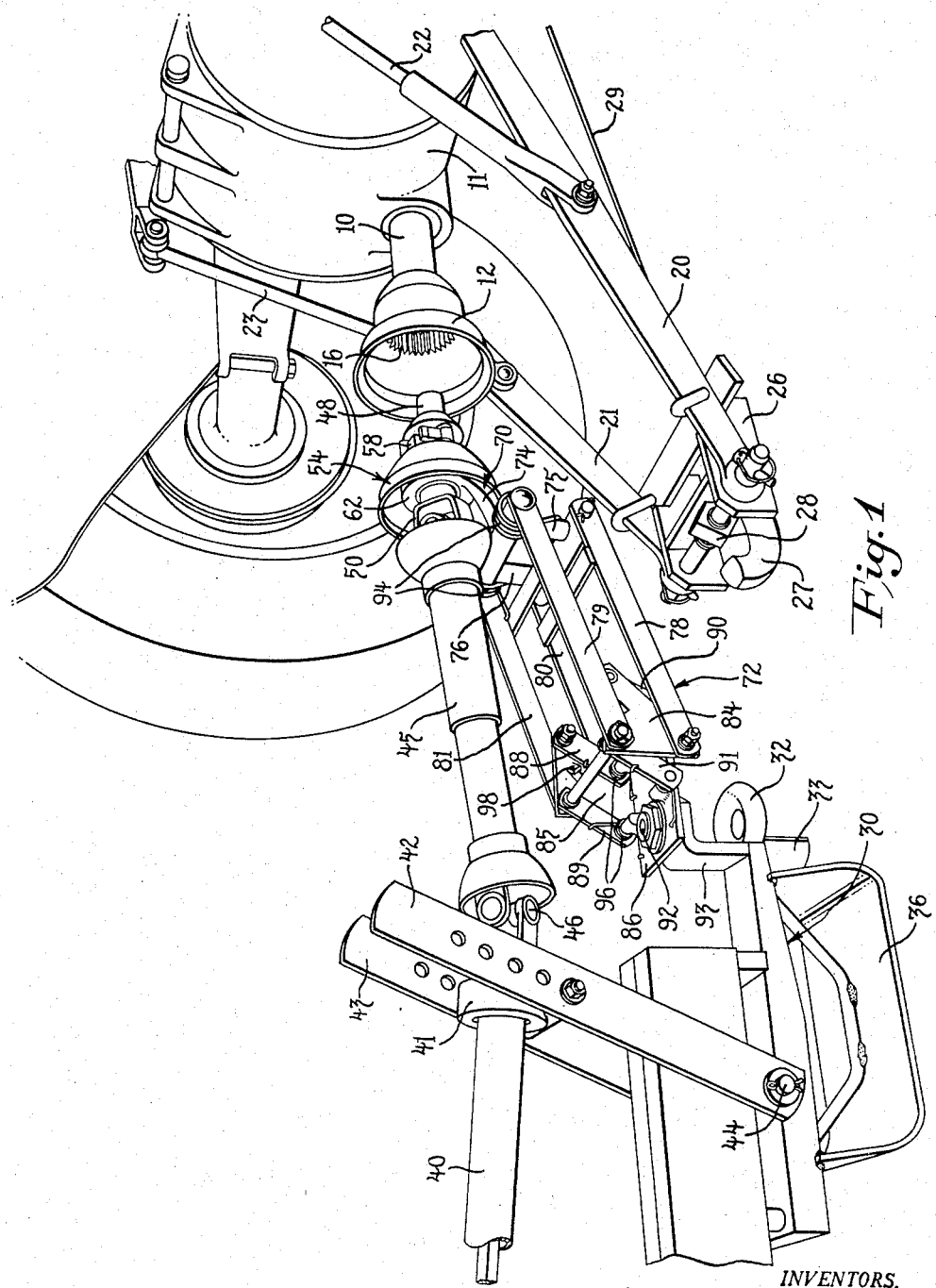
Figure 1 is a perspective view taken generally from the right-rear side of the tractor and showing an implement embodying the invention and in a disconnection position.
Figure 4:
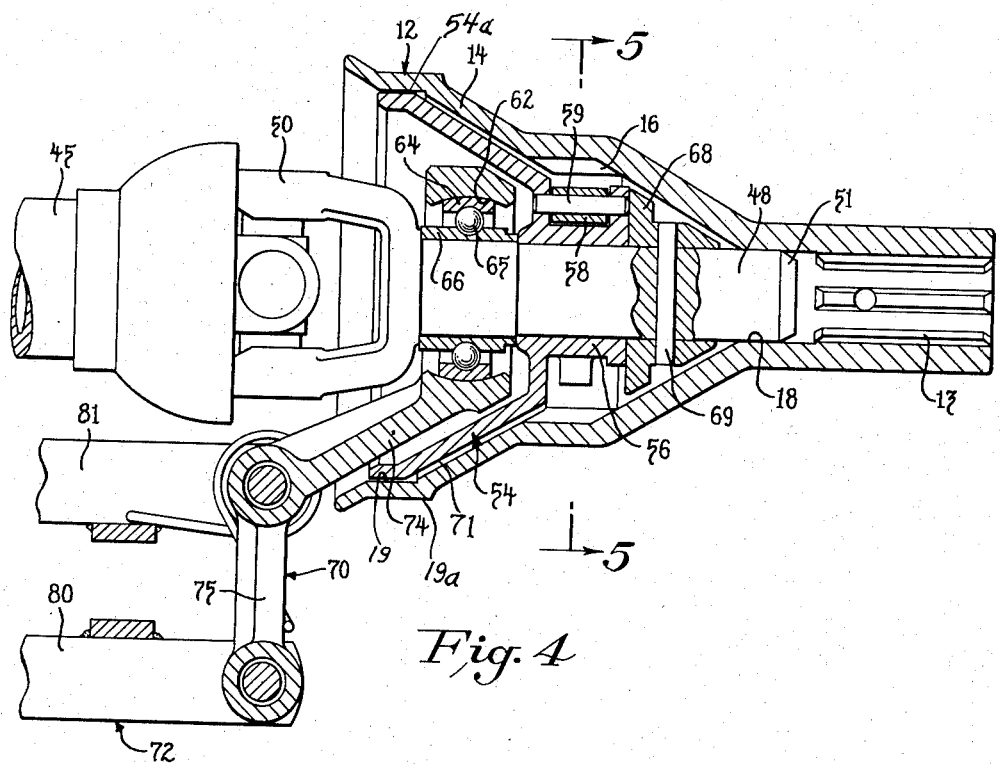
Figure 4 is a side elevational cross-sectional view of the connection shown in Figure 2, but on an enlarged scale, and showing the overrunning clutch which forms a ready connection between the implement and tractor power shafts.

Referring more particularly to the drawings, a power-take-off shaft 10 extends rearwardly from the tractor 11 and has secured thereto a receiving socket or bell mouth housing 12 by means of its splined section 13. The bell mouth faces rearwardly and is formed by the flared funnel portion 14. A set of internal teeth 16 are formed around an intermediate inner peripheral portion of the bell and form one element of an overrunning clutch. The forward end of the bell casting terminates in a reduced bore 18 forming a pilot portion. Another pilot surface is formed by the internal surface 19 of flange 19a. Thus the entire bell 12 is rotatably driven with the P. T. O. shaft 10 by the tractor.

The tractor also has a pair of conventional lower, laterally spaced draft links 20, 21 which are vertically positionable by hydraulically operated lift arms 22, 23 in the well known manner. The rear ends of links 20, 21 are secured together by frame assembly 26 having a latch member in the form of an upwardly extending hook 27. The hook can be closed or "moused" by a conventional spring latch 28 operated through rod 29 from the tractor seat.

The drawframe 30 of the implement to be attached to the tractor is shown here as terminating at its forward end in another latch member in the form of a large eye 32 up through which the hook 27 is adapted to pass when the lift arms 20, 21 are raised. A shield or guide 33 is provided to align the hook with the eye just prior to engagement and slidably guides the hook into the eye. Thus quick detachable latch elements 27, 32 are provided for the tractor and implement, respectively. A parking stand 36 is welded to the drawframe 30 and supports the front end of the implement on the ground when the implement is unattached to the tractor.

Figure 5:
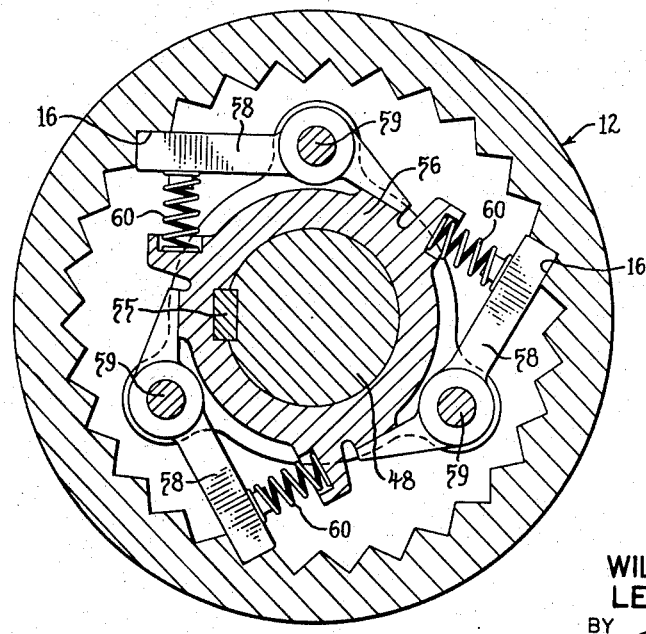
Figure 5 is a cross-sectional view of the clutch, taken on line 5—5 of Figure 4, but on an enlarged scale.

The rear portion 40 of the driven implement power shaft is of the telescopic type and is journaled into a bearing 41 carried by upstanding arms 42, 43 which are pivoted to the drawframe at 44. An intermediate portion 45 of the power shaft is connected at its rear end by the universal joint 46 to shaft 40. The front end of the intermediate shaft portion 45 is connected to a front stub portion 48 by the universal joint 50. The pilot portion or nose 51 of stub shaft 48 is beveled to facilitate entry into the bore 18 where it is piloted when in the driving position. A cone member 54 is rigidly secured by key 55 (Fig. 5) to shaft 48 for rotation therewith. Secured around the periphery of the cone hub 56 are over-running clutch elements in the form of three pawls 58 which are pivotally mounted on their respective pins 59 and urged by spring 60 into engagement with the internal teeth 16 of the bell housing 12. When the cone 54 is fully in the bell 12 the pawls engage teeth 16 to transmit drive in one direction only, that is, when the drive shaft 10 is transmitting power to the implement. The assembly acts as an over-running clutch, the pawls merely clicking over the teeth if the sense of the drive is reversed. The stub shaft 48 is rotatably supported in the bracket 70 by the ball bearing assembly including the outer race 64, balls 65 and inner race 66. The outer periphery of the outer race 64 is spherical and can rotate slightly in the spherical surface 62 of bracket 70 to permit some freedom of movement. The inner race 66 is held against the universal joint 50 and together with the cone member is secured on shaft 48 against axial movement by the collar 68 held captive by pin 69 extending through shaft 48. The rearwardly diverging flared portion 71 surrounds the bearing assembly and effectively protects it against damage during the coupling operation. This flared portion also helps guide the shaft 48 into the bell housing.

Cone 54 terminates at its rear end in a flange 54a which fits within pilot surface 19a and together with pilot members 48, 18 acts to maintain correct alignment of the members 12 and 54 so as to insure proper operation of the overrunning clutch.

Bracket 70 is supported on a double parallelogram linkage 72 which permits independent vertical and horizontal movement of the front end of the implement power shaft relative to the implement. More specifically, the bracket 70 also has a rearwardly and downwardly extending arm 74 and laterally spaced vertical arms 75, 76. The forward ends of the generally horizontal and parallel arms 78, 79 and 80, 81 are pivotally attached to bracket 70 and are adapted to rise and fall but maintain the front end of the implement shaft at a substantially constant attitude to the ground and tractor.

The rear end of the horizontal parallel arms 78, 79 and 80, 81 are pivotally attached to motion members 84, 85 respectively. These members take the form of plates 84, 85 and in turn are swingably connected, for fore and aft shifting motion, to a support member in the form of a horizontal plate 86 by the two pairs of generally vertical parallel arms 88, 89 and 90, 91, respectively. Horizontal plate 86 is pivoted on bolt means 92 which also extends through bracket 93 to form a vertical pivotal axis for horizontal swinging movement of the entire double parallel arm arrangement and implement power shaft.

The two counterbalance torsion springs 94 balance the weight of the drive shaft and their mounting and together with the wing nut adjustment 95 (Fig. 3) permit the cone 54 to be set and held at any predetermined height so as to be in registry with the bell housing 12 of the tractor.

Similar torsion springs 96 on the vertical parallel arm linkage 88—91 tend to urge the implement shaft and cone to a forward position.

It will be noted that the entire double parallel arm arrangement can swing horizontally about a vertical axis 92 that is coincident with the eye 32 on the front of the drawframe.

Operation

Referring to Figure 1, to attach the power shaft and implement to the tractor, the tractor is backed towards the implement and the hook lowered to the ground. The cone 54 and stub shaft 48 are guided into the bell 12 and when fully inserted, the driving pawls 58 engage the teeth 16 of the bell. Upon further backward motion of the tractor the rear section 40 of the implement shaft is caused to telescope together and the vertical parallel arm linkage is pushed to a backward leaning position against the torque of the springs 96, until a stop 98 is reached. Further rearward movement simply causes the implement to move rearwardly and at this time the operator knows the hook 27 is in vertical alignment with the eye 32. Upon raising of the hook through the links 20, 21 the hook engages the eye thus raising the drawframe clear of the ground as shown in Figure 2. Any relative movement between the tractor and implement power shafts is accommodated by the horizontal and vertical parallel arm linkages.

The tractor must be backed only reasonably in line with the cone and eye. The over-running clutch not only provides the conventional over-run feature but also provides a convenient and easily aligned "spline" connection between the power shafts. It will be appreciated that a conventional spline connection would be impractical and almost impossible to align because of the close tolerances required of such a joint. Here, however, the dogs 58 of the clutch act as one of the "splined" sections and can yield against their springs 60 to permit easy access into the socket 12.

To unhitch the implement the latch 28 is opened by the operator by rod 29 and the hydraulic lift arms 22, 23 lowered, thus first parking the implement frame on its foot 36 and then withdrawing the hook from the eye. The tractor is then simply driven forward to disengage the cone and bell. The implement power shaft remains at the proper height for reattachment due to the counterbalance spring 94 and friction device 95. The hitch is selectively settable to accommodate various tractor P. T. O. heights by the friction screw 95 which varies the frictional resistance to movement between the bracket 70 and links 79, 81. The power shaft is urged to a forward position by the spring 96 where it is ready to again be inserted into the socket 12.

We claim:

1. In combination, a tractor having a power-take-off shaft extending rearwardly therefrom including a guiding socket secured thereto, an over-running clutch element in said socket, an elevationally positionable latch element carried by said tractor, an implement having a latch element adjacent its forward end and adapted to be engaged by said positionable latch element for moving said implement between raised and lowered positions, a telescopic power shaft carried by said implement and having a front end extending in a forward direction in respect to normal implement travel, a second over-running clutch element carried by said shaft front end and adapted to slidingly engage said socket clutch element and be driven thereby when said front end is fully inserted in said socket, linkage means secured to said implement and said power shaft for selectively holding the latter in a predetermined vertical and forward position in respect to said implement and permitting relative lateral swinging between said implement and said shaft front end.

2. The combination set forth in claim 1 further characterized in that said linkage means comprises, a horizontal parallel arm linkage for holding said power shaft in a predetermined vertical position, a vertical parallel arm linkage for normally holding said power shaft in a forward direction.

3. In combination, a tractor having a power-take-off shaft extending rearwardly therefrom including a guiding socket secured thereto, clutch teeth in said socket, an implement carrying a telescopic power shaft having a front end extending in a forward direction in respect to normal implement travel, spring loaded clutch dogs carried by said shaft front end and adapted to slidingly engage said teeth and be driven thereby when said front end is fully inserted in said socket thereby forming an over-running clutch linkage means secured to said implement and said power shaft for selectively holding the latter in a predetermined vertical and forward position in respect to said implement and permitting relative lateral swinging between said implement and said shaft front end.

4. The combination set forth in claim 3 further characterized in that said linkage means comprises, a horizontal parallel arm linkage for holding said power shaft in a predetermined vertical position, a vertical parallel arm linkage for normally holding said power shaft in a forward direction.

5. In combination, a tractor having a power-take-off shaft extending rearwardly therefrom including a funnel shaped socket secured thereto, clutch teeth in said socket, an elevationally positionable hook carried by said tractor, an implement having an eye adjacent its forward end adapted to be engaged by said hook for moving said implement vertically, a telescopic power shaft carried by said implement and having a front end extending in a forward direction in respect to normal implement travel, an over-running clutch element carried by said shaft front end including spring loaded dogs adapted to slidingly engage said teeth and be driven thereby when said front end is fully inserted in said socket, a holding device for said shaft front end including a support member pivotally secured on a generally vertical axis to said implement, a motion member, generally vertical parallel arms secured to said support member and said motion member, a bracket for rotatably supporting said shaft front end, generally horizontal parallel arms secured to said motion member and said bracket whereby said device can swing about said vertical axis and said power shaft can shift in vertical and front and rear directions relative to said implement.

6. A power shaft holding device for an implement having a power shaft extending from the front end thereof including, a support member pivotally secured on a generally vertical axis to said implement front end, a motion member adapted to shift in a front and rear direction, generally vertical parallel arms secured at one of their ends to said member and at their other end to said motion member, a bracket rotatably supporting said power shaft, generally horizontal parallel arms pivoted at one of their ends to said motion member and at their other end to said bracket, whereby said device can swing about said vertical axis and said power shaft can shift in vertical and front and rear directions relative to said implement, said device having resilient means for urging said shaft in a forwardly and upwardly direction.

7. A device as defined in claim 6 including an adjustable friction means for said horizontal arms for selectively setting the vertical position at which the shaft will be held.

8. A power shaft holding device for an implement having a power shaft extending from the front end thereof including, a support member pivotally secured on a generally vertical axis to said implement front end, a motion member adapted to shift in a forward and rearward direction, generally vertical parallel arms secured at one of their ends to said member and at their other end to said motion member, said vertical arms having resilient means for urging them in a forward direction, a bracket rotatably supporting said power shaft, generally horizontal parallel arms pivoted at one of their ends to said motion member and at their other end to said bracket, said horizontal arms having resilient means for urging them in a forward direction, whereby said device can swing about said vertical axis and said power shaft can shift in vertical and front and rear directions relative to said implement.

9. A device as defined in claim 8 including an adjustable friction means for said horizontal arms for selectively setting the vertical position at which the shaft will be held.

10. A power shaft holding device for an implement having a power shaft extending from the front end thereof including, a support plate pivotally secured on a generally vertical axis to said implement front end, a motion member adapted to shift in a front and rear direction, generally vertical parallel arms secured at their lower ends to said plate and at their upper end to said motion member, a bracket rotatably supporting said power shaft, generally horizontal parallel arms arranged in a fore and aft direction and pivoted at their rear ends to said motion member and at their front end to said bracket, whereby said device can swing about said vertical axis and said power shaft can shift in vertical and front and rear directions relative to said implement, said device having resilient means for urging said shaft in a forwardly and upwardly direction.

11. A device as defined in claim 10 including an adjustable screw friction means between said horizontal arms and said bracket for selectively determining the vertical height at which the shaft will be held.

12. An automatic coupling for a rearwardly extending power-take-off shaft of a tractor, a funnel shaped housing secured to said shaft and having a large open end facing rearwardly, internal clutch teeth intermediate its length and a pilot bore adjacent its front end; an implement shaft having a front end which forms a pilot portion at its front end adapted to slide into said pilot bore; a cone rigidly secured to said shaft and adapted to slide within said housing and having a plurality of spring loaded pawls for driving engagement in one direction only with said teeth, said cone also having a rearwardly diverging flared portion for guiding said shaft into said housing and means for supporting said implement shaft so that it may be brought into approximate axial alignment with said housing and the pilot portion of the shaft may be slid into the pilot bore of the housing.

13. An automatic coupling for a rearwardly extending power-take-off shaft of a tractor, including; a funnel shaped housing secured to said shaft and having a large open end facing rearwardly, internal clutch teeth intermediate its length and a pilot bore adjacent its front end; an implement shaft having a front end forming a pilot portion adapted to slide into said pilot bore; a bearing assembly for rotatably supporting said shaft; a cone rigidly secured to said shaft and adapted to slide within said housing and having a plurality of spring loaded pawls for driving engagement in one direction only with said teeth, said cone also having a rearwardly diverging flared portion surrounding said bearing assembly and means mounting said bearing assembly for supporting said implement shaft so that it may be brought into approximate axial alignment with said housing and the pilot portion of the shaft may be slid into the pilot bore of the housing.

14. An automatic coupling for a power-take-off shaft of a tractor, said shaft extending rearwardly from said tractor, including; a housing secured to said shaft and having a funnel shaped portion at its rear end, internal clutch teeth intermediate its length and a pilot bore adjacent its front end; an implement shaft extending in a front and rear direction in respect to said tractor and adapted to be guided by said funnel portion and slidingly received in said housing and driven thereby, said implement shaft including, a pilot portion at its front end adapted to slide into said pilot bore; a bearing assembly for rotatably supporting said shaft; a cone rigidly secured to said shaft and adapted to slide within said housing and having a plurality of spring loaded pawls for driving engagement in one direction only with said teeth, said cone also having a rearwardly diverging flared portion surrounding said bearing assembly and means mounting said bearing assembly for supporting said implement shaft so that it may be brought into approximate axial alignment with said housing and the pilot portion of the shaft may be slid into the pilot bore of the housing.

15. In combination, a tractor having a power take-off shaft extending rearwardly therefrom, including a first coupling member, an elevationally positionable latch element carried by said tractor, an implement having a latch element adjacent its forward end and adapted to be engaged by said positionable latch element for moving said implement between raised and lowered positions, a telescopic power shaft carried by said implement and having a front end extending in a forward direction in respect to normal implement travel, a second coupling member carried by said shaft front end adapted to engage said first coupling member so as to be driven thereby, linkage means secured to said implement and said power shaft for selectively holding the latter in a predetermined vertical and forward position in respect to said implement and permitting relative lateral swinging between said implement and said shaft front end.

References Cited in the file of this patent

UNITED STATES PATENTS

| | | |
|---|---|---|
| 1,827,070 | Coultas et al. | Oct. 13, 1931 |
| 2,427,824 | Vutz | Sept. 23, 1947 |
| 2,614,405 | Clausen | Oct. 21, 1952 |
| 2,761,299 | Huddle | Sept. 4, 1956 |